(12) United States Patent
Reagor et al.

(10) Patent No.: US 7,149,472 B2
(45) Date of Patent: Dec. 12, 2006

(54) THROUGH-THE-EARTH RADIO

(75) Inventors: David Reagor, Los Alamos, NM (US); Jose Vasquez-Dominguez, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 11/364,396

(22) Filed: Feb. 28, 2006

(65) Prior Publication Data

US 2006/0148514 A1 Jul. 6, 2006

(51) Int. Cl.
*H04B 13/02* (2006.01)

(52) U.S. Cl. .................. 455/40; 455/41.3; 455/131; 375/295; 375/219; 340/854.6

(58) Field of Classification Search ............... 455/40, 455/41.3, 131; 375/295, 219; 340/854.6
See application file for complete search history.

(56) References Cited

U.S. PATENT DOCUMENTS

| | | | |
|---|---|---|---|
| 4,777,652 A | 10/1988 | Stolarczyk | |
| 6,363,189 B1 | 3/2002 | Minakata et al. | |
| 6,370,396 B1 | 4/2002 | Meiksin et al. | |
| 6,424,816 B1* | 7/2002 | Stephens | 455/2.01 |
| 6,647,149 B1* | 11/2003 | Keeney et al. | 382/240 |
| 6,812,853 B1* | 11/2004 | Matsui | 340/870.1 |
| 6,904,270 B1* | 6/2005 | Chan | 455/156.1 |
| 6,968,564 B1* | 11/2005 | Srinivasan | 725/9 |
| 2002/0191691 A1* | 12/2002 | Holborow | 375/240 |
| 2003/0162512 A1* | 8/2003 | Lauterbach et al. | 455/120 |
| 2003/0194004 A1* | 10/2003 | Srinivasan | 375/240 |
| 2003/0210337 A1* | 11/2003 | Hall | 348/231.99 |

* cited by examiner

*Primary Examiner*—Danh C. Le
(74) *Attorney, Agent, or Firm*—Mark N. Fitzgerald (57) ABSTRACT

A through-the-earth communication system that includes a digital signal input device; a transmitter operating at a predetermined frequency sufficiently low to effectively penetrate useful distances through-the earth; a data compression circuit that is connected to an encoding processor; an amplifier that receives encoded output from the encoding processor for amplifying the output and transmitting the data to an antenna; and a receiver with an antenna, a band pass filter, a decoding processor, and a data decompressor.

14 Claims, 8 Drawing Sheets

THROUGH-THE-EARTH RADIO

STATEMENT REGARDING FEDERAL RIGHTS

This invention was made with government support under Contract No. W-7405-ENG-36 awarded by the U.S. Department of Energy. The government has certain rights in the invention.

RELATED APPLICATIONS

This application claims the benefit of provisional application No. 60/483,146 filed on Jun. 26, 2003, titled "Underground Radio", and nonprovisional application 10/719,426 filed on Nov. 20, 2003, titled "Underground Radio".

FIELD OF THE INVENTION

The present invention generally relates to radio communications and, more specifically relates to communication through-the-earth to or from an underground position.

BACKGROUND OF THE INVENTION

Anytime personnel or equipment are located underground, such as in mines, tunnels or boreholes, a need exists for communication through-the-earth. In the past, such communications were problematic and often ineffective. While phone lines between fixed points provide some measure of communication, these fixed locations may be difficult or impossible to reach in emergency situations. Additionally, even in normal conditions, mobile communications are necessary to carry out a specific function.

Traditional radio communication utilizes frequencies above 500 kHz. These higher frequency signals typically travel only 1–10 meters into sedimentary rocks. Much greater penetration can be attained by using lower frequency transmissions, but both the transmitting and receiving ends usually require very large antennas to overcome the electrical noise inherent in typical semiconductor components. Thus, direct radio communication with underground positions has proven extremely difficult.

Other attempts at surface to underground communication have included using tunnel structures as transmission lines, usually by coupling a carrier wave onto an electrical power line (see U.S. Pat. No. 4,777,652). Other systems also have been developed that use a cable with poorly confined fields, known as a leaky feeder, along with a number of repeaters to bring UHF or VHF radio service to underground areas. Another method has been to communicate with an array of transceivers connected by cables (see U.S. Pat. No. 6,370,396). This method suffers from limited range, and is easily interrupted by damage to the cables. It is therefore clear that an efficacious wireless underground communication system currently does not exist.

Previous attempts at through-the-earth communication typically have involved paging systems (see U.S. Pat. No. 6,263,189). This type system can be implemented easily in a one-way format only using existing receivers. The transmitters can be quite large, but this usually not a problem as they can be installed in a permanent location underground. In the present invention, a system has been developed that combines through-the-earth communication, low noise receivers, and digital voice compression technologies. This combination provides for two-way voice communication through-the-earth.

Figure 1:
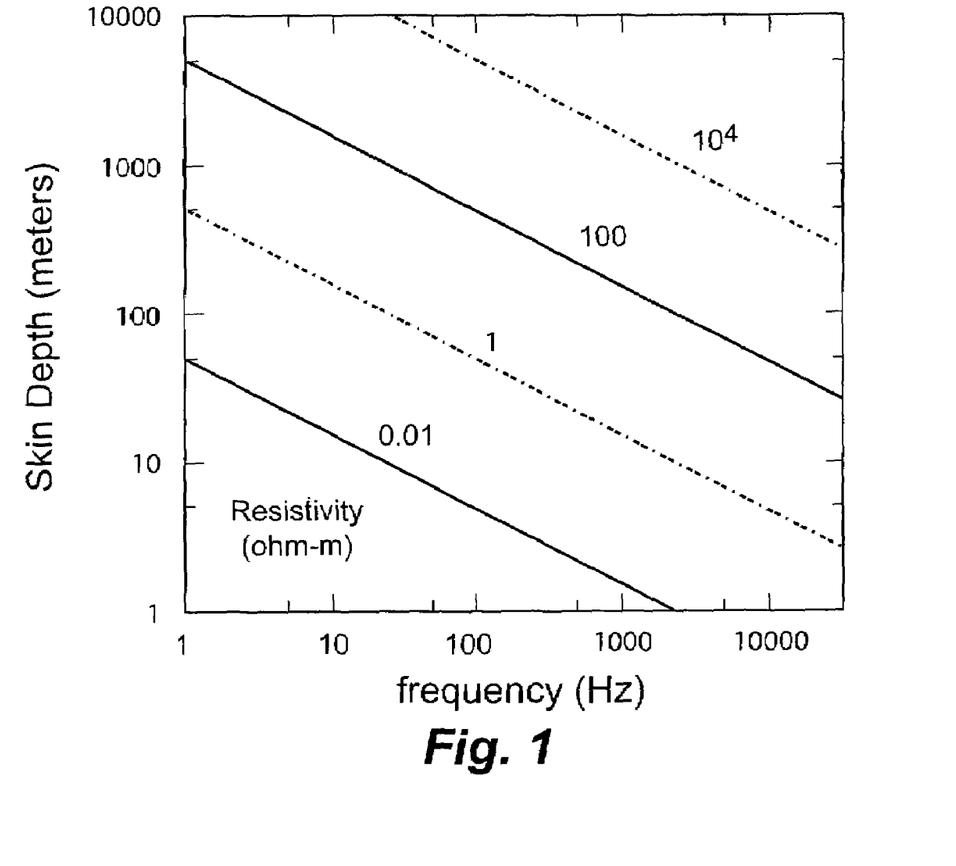
FIG. 1 is a graph of skin depth versus frequency for selected resistivities.

To understand the present invention, it is first necessary to review electromagnetic propagation of RF signals in the earth, the superconducting technology used in the receivers, and the existing audio technology. Solutions of the electromagnetic wave equations in the low frequency limit show the signal strength varies as $\exp(-x/\delta)$, where $\delta=(2\rho/\omega\mu)^{1/2}$ is the depth of penetration. Here, $\rho$ is the resistivity, $\omega$ is the angular frequency, and $\mu$ is the magnetic permeability. This relationship is illustrated in FIG. 1, where the relative magnetic permeability is assumed to be unity. Evaluating the skin depth for actual geologies is not straightforward because the resistivity is quite variable. Table 1 indicates how wide this variability is in practice.

TABLE 1

| Selected Resistivities (ohm-m) | | | | | |
|---|---|---|---|---|---|
| granite | 5000 × $10^6$ | sea water | 0.2 | rock salt | $10^6$–$10^7$ |
| coal | $10^4$ | sandstone | 35–4000 | limestone | 120–400 |
| mudstones | 10–100 | haematite | $10^{-1}$–100 | galena | $10^{-2}$–300 |
| pyrite | $10^{-4}$–10 | calcopyrite | $10^{-4}$–0.1 | magnetite | $10^{-2}$–10 |
| pyrrhotite | $10^{-5}$–$10^{-3}$ | | | | |

Examining the results for a typical material, sandstone, the relationship above yield a resistivity greater than 35 ohm-meter, corresponding to a skin depth of greater than 100 meters at a frequency of 1 kHz. Conventional radio transmissions use frequencies higher than 500 kHz, but these higher frequencies are weakly ground penetrating. These results clearly imply a skin depth in common materials that would allow frequencies below 1 kHz to penetrate deeply underground. Those with skill in this art will note that many of the economically valuable ores, chalcopyrite for example, have a much lower resistivity, a fact that is used in currently established electromagnetic prospecting tools.

Geophysical noise floors were carefully studied decades ago in this spectral range. It was found that noise floors vary according to such things as the location and the weather, but is on the order of 100 fT/$\sqrt{\text{Hz}}$ at 100 Hz, and decreases at higher frequencies. Importantly, this noise originates in the ionosphere. The fields that were measured at the surface of the earth in these previous studies, and are attenuated by the earth's overburden before reaching underground areas. When transmitting from a surface antenna to an underground position, the transmitted signal and the geophysical noise will be attenuated equally, maintaining the signal-to-noise ratio constant.

High temperature superconducting receivers are not expected to have noise floors below 1 fT/$\sqrt{\text{Hz}}$ in the foreseeable future. Large antennas, such as those used in base stations could have a noise floor lower than the SQUIDs, but reasonable dimension limits, that is, a few meters, preclude any noise floors below those previously discussed. Thus, the naturally occurring noise easily could be negligible in all applications.

The dominant source of noise in a developed underground environment above the noise floor is the power line noise introduced by operations at the site. This power line noise consists of 60 Hz and synchronized harmonics, with the harmonics decreasing rapidly with increasing frequency. This leaves a large spectral range in which to operate.

High Temperature Superconducting (HTS) electronics have the potential to be used in a wide range of applications. This is because superconducting components usually are the lowest noise and lowest power electronics available. The basic superconducting component is the Superconducting Quantum Interference Device (SQUID), which consists of two Josephson junctions connected in parallel to form a loop. This device function by using a quantum interference effect to generate a voltage that is very sensitive to the magnetic flux threading the loop. In an actual application, a SQUID is operated with external electronic circuitry that applies current bias and flux modulation. The voltage output of the SQUID is fed to a preamplifier, and then to a phase lock circuit referenced to the modulation. The phase lock output is integrated, and superimposed out of phase onto the modulation signal. This results in the locking of the SQUID to the operating point of a specific flux. The feedback signal is then proportional to the magnetic flux flowing through the SQUID.

Of course, a communication receiver employing SQUIDs requires additional electronic circuitry that demodulates the carrier signal. Additionally, a SQUID receiver needs a cryogenic enclosure, but, using High Temperature Superconductors, the size of the receiver need not be large, as it would be if Low Temperature Superconductors (LTS) were being used. Actually, the lower cryogenic requirements of HTS allow large cost and power savings over LTS.

Traditional analog radio often uses the human voice as audio input at full bandwidth and modulates a radio frequency signal either in frequency or amplitude. In this situation, the resulting bandwidth of the RF signal equals or exceeds the bandwidth of the original audio. As previously discussed, signals that travel through the earth for substantial distances must use a carrier frequency of only a few kilohertz. This bandwidth is insufficient to carry the analog audio. However, when the analog audio is converted to a digital stream, a full audio signal typically will have a 16-bit data acquisition rate at 20 thousand samples per second. For voice audio alone, the bit rate can be reduced to 64,000 bits/sec, but this is still too high for a carrier signal of a few kilohertz.

Digital compression techniques are well developed and take advantage of the fact that the information rate in the human voice is quite low, and that much of the audio content can be discarded while retaining necessary intelligibility. Two algorithms that accomplish this compression are linear predictive coding (LPC) and multi-band excitation (MBE). LPC uses the natural resonances human speech generation to eliminate excess information in the digitized signal. MBE uses a number of frequency bands to recognize speech content. For the present invention, an MBE based algorithm implemented on a discrete digital signal processor is used. The use of audio compression allows a reduction of the bit rate to several thousand bits per second, while maintaining intelligibility. By combining audio compression techniques with digital communication on a low frequency carrier one can obtain through-the-earth transmission of voice.

As will be made clear below, the present invention is capable of transmitting intelligible audio or other data underground for a distance in excess of 100 meters. Audio also has been transmitted successfully on an axis perpendicular to the plane of the antenna, the most difficult direction to send signals.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In order to achieve the objects and purposes of the present invention, and in accordance with its principles and objectives a through-the-earth communication system comprises a digital signal input device connected to a transmitter operating at a predetermined frequency sufficiently low to effectively penetrate useful distances through-the earth, receiving the digital signal input and passing the digital signal input to a data compression circuit whose output is connected to an encoding processor. An amplifier receives encoded output from the encoding processor for amplifying the encoded output and outputting the encoded output to an antenna. A receiver having an antenna receives said encoded output and passes said encoded output to a band pass filter being connected to a decoding processor whose output is connected to an data decompressor, the data decompressor providing a decompressed digital signal.

In a still further aspect of the present invention and in accordance with its principles and objectives, a method of conducting through-the-earth communication comprises the steps of inputting an analog signal; digitizing the analog signal; compressing the digitized signal; encoding the compressed digitized signal to encode a predetermined data stream into the compressed digitized signal; and outputting the encoded compressed digitized signal through an antenna at a predetermined frequency that is sufficiently low to effectively penetrate useful distances through-the-earth as a transmitted signal; receiving the transmitted signal with an antenna after the transmitted signal has propagated through-the-earth; converting the transmitted signal from an analog signal to a digital signal: decoding the digital signal; decompressing the digital signal; and outputting the decoded decompressed digital signal.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

The present invention provides audio communication deep into underground locations. The invention can most easily be understood through reference to the drawings.

Figure 2:
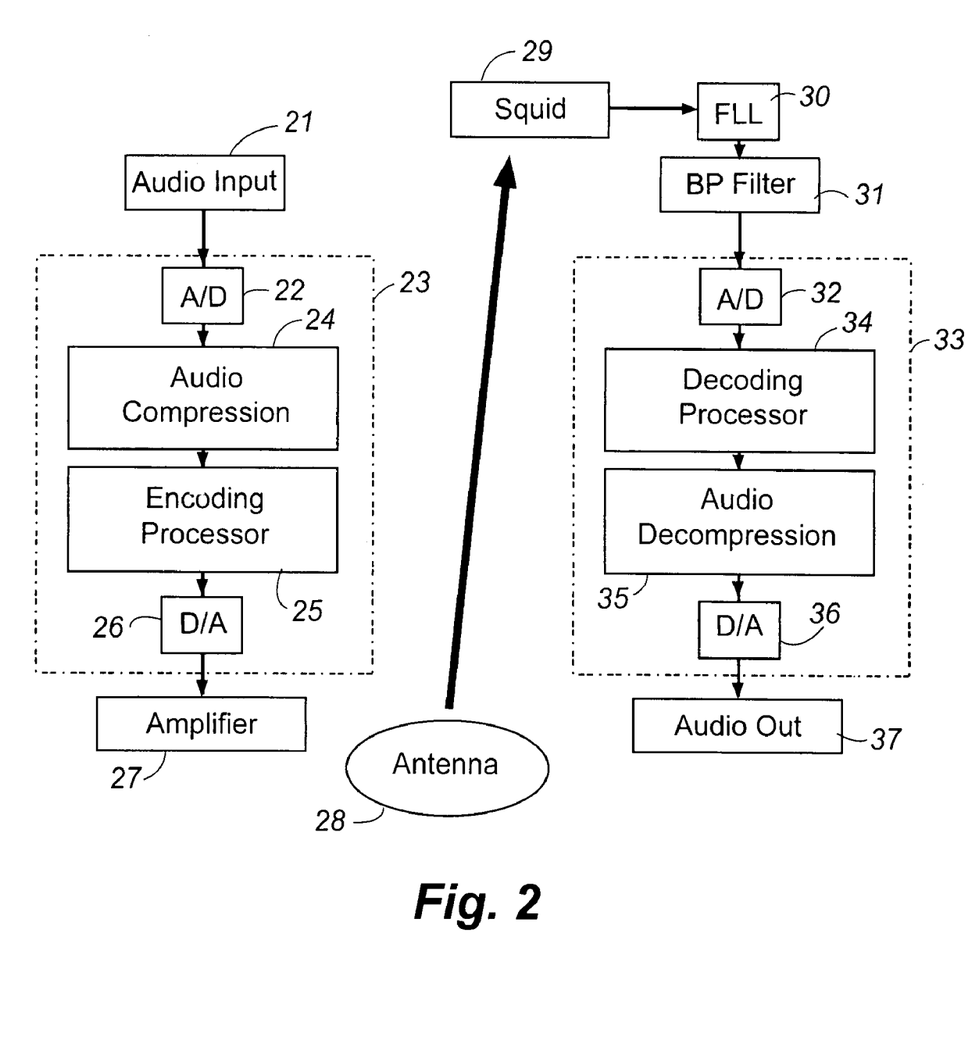
FIG. 2 is a block diagram of the components of the present invention.

Referring first to FIG. 2, where a block diagram of the present invention is shown. Audio to be transmitted is input to audio input 21 and sent to analog to digital (A/D) converter 22 on board 23. Audio input 21 may be any desired audio input device, including a conventional microphone. Audio input 21 can be configured to accept input from remotely located walkie-talkies or other personal communication devices. Board 23 contains all the components for both transmitting and receiving. However, in FIG. 2, board 23 is configured to transmit. As shown A/D converter 22 provides its signal to audio compression 24, where it is compressed, and sent to encoding processor 25. Encoding processor 25 uses quadrature phase shift keying (QPSK), which is a technique that uses a constant amplitude signal with a 90° phase shift to encode the compressed audio signal. The four phases allowed by encoding processor 25 constitute a 2 bit per symbol constellation in both phase and amplitude space. This provides the low frequency carrier upon which the audio signal is sent through the earth.

It is possible also to use QAM-16 and QAM-32, sixteen and thirty-two state constellations in phase and amplitude space to send for or five bits per symbol. The QAM-16 constellation has symbols that are equally spaced in a square lattice in phase and amplitude space. For a data rate of 2000 bits per second, the symbol rate is shown in Table 2:

TABLE 2

| Constellation | Bits per Symbol | Symbol Rate (sec$^{-1}$) |
| --- | --- | --- |
| QPSK | 2 | 1000 |
| QAM-16 | 4 | 500 |
| QAM-32 | 5 | 400 |

Any of these data rates can be used in present invention, but testing has primarily employed the QAM-16 constellation. This encoding process is implemented by encoding processor 25.

Digital to analog converter 26 receives the modulated carrier from encoding processor 25, converts the digital signal to analog and outputs it to amplifier 27. Amplifier 27 may be a standard audio amplifier. For base stations, amplifier 27 could have a power of approximately 10 Watts, while portable units could utilize a battery-powered amplifier 27 with an output of approximately 1 Watt.

The amplified modulated carrier is output to antenna 28 for transmission through the earth. Antenna 28 can be any appropriately dimensioned antenna for the frequency used. In testing of the present invention both multi-turn loops of wire and wire wrapped around a ferrite rod have been successfully employed.

The transmitted signal from antenna 28 propagates through the earth until it reaches antenna 29. Antenna 29 can be any antenna appropriate for a particular underground application. In many cases, an appropriately sized simple loop antenna may provide the required reception. Other, more severe applications may require antenna 29 to be SQUID 29a with accompanying flux locked loop (FLL) 30, which modulates the flux of SQUID 29a with high-frequency alternating current and uses a lock-in amplifier circuit to isolate the voltage component at the modulation frequency. The received signal from either antenna 29 or SQUID 29a with FLL 30 then passes to band pass filter 31 where the selected frequencies of interest are passed on to A/D converter 32 on board 33. Band pass filter 31 can be a of a wideband 4-pole elliptic design. The bandwidth of such a band pass filter 31 is sufficient to allow variation in the carrier frequency and modulation necessary to allow human speech to be understood. This bandwidth is required to prevent power-line fundamental first few harmonics signals from dominating the dynamic range of A/D converter 32, which also is a 16-bit device.

From A/D converter 32, the signal is decoded in decoding processor 34 and decompressed in audio decompression 35. The now decoded and decompressed signal is then converted back to an analog signal by D/A converter 36 before being output to audio device 37, which may be earphones, headphones or, in certain applications, a speaker.

Figure 3:
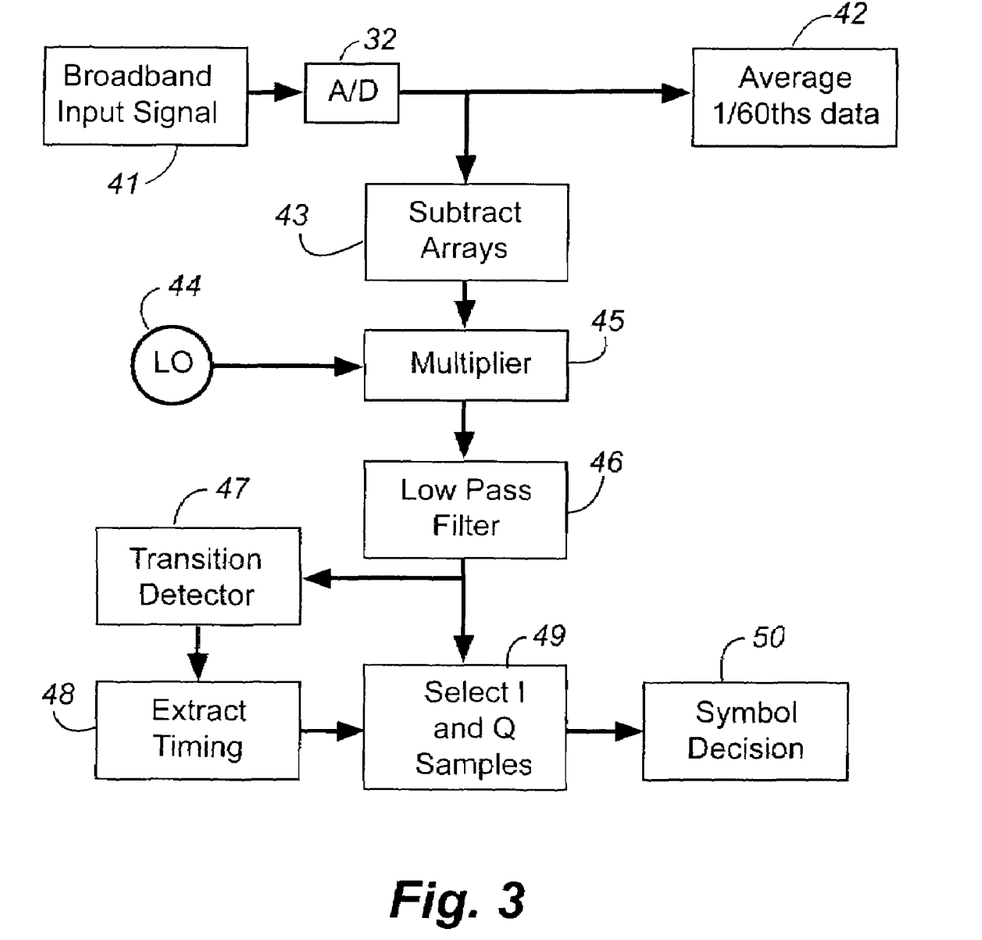
FIG. 3 is a block diagram of the decoding processor shown in FIG. 2.

All of the functions of boards 23, 33 can be implemented on a general-purpose digital signal processor (DSP). This allows the coding methods, filtering algorithms, and carrier frequencies to be software controlled. The specific actions of decoding processor 33 are illustrated in FIG. 3. As seen, the broadband input signal 41 is provided to A/D converter 32 and its digital output is provided to average ⅟₆₀ ths data 42, which breaks broadband input signal 41 into arrays that are one power cycle long. The arrays are averaged to produce a one power cycle long array of reference data containing the weakly time varying harmonics of 60 Hz. This average array then is subtracted from broadband input signal 41 in subtract arrays 43. The harmonics of 60 Hz are, in fact, phase locked to the power frequency, and are filtered by this method. This comb filter method removes the power line interference in the communication band, and allows the present invention to use bandwidths of many hundreds of Hertz.

Local oscillator 44, normally a separate component in most communication systems, is here implemented in software as a sine and cosine generator that is provided to multiplier 45, also implemented in software, where two products are produced: the in-phase, or "I" component, and the quadrature, or "Q" component. These components are then low pass filtered by low pass filter 46, also implemented in software, and then sent to transition detector 47. Transition detector 47 checks for rapid changes in either the "I" component or the "Q" component. Any such rapid changes indicate a new symbol is present. Extract timing 48 extracts the symbol timing, which is then used to shift sampling to the middle of the symbol. Select I and Q samples 49 provides an average centered in time on the symbol. Finally, symbol decision 50 extracts the symbol stream from the demodulated signal by scaling the "I" and "Q" samples and rounding each to find a symbol, which are the most significant bits of each component. For the QAM-16 constellation, each symbol contains four bits of information, two bits in the "I" component and two bits in the "Q" component.

Figure 4:
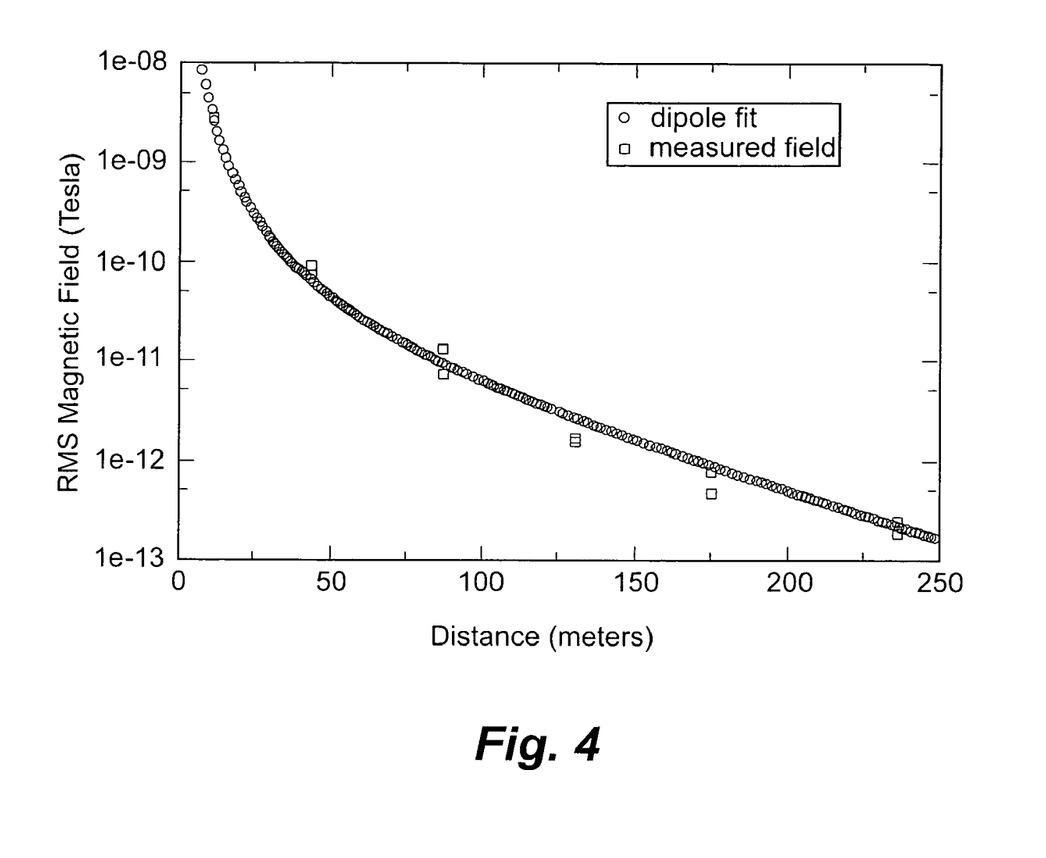
FIG. 4 is a graph of magnetic field as a function of distance from a small antenna, measured at a mine.

Electromagnetic propagation has been explored in an actual mine. In FIG. 4, the signals obtained at a Molycorp, Inc. mine in Questa, N.Mex. are illustrated. The electromagnetic source was a sine wave at a frequency of 7.46 kHz, having a power of 16.2 watts. The measured magnetic field was recorded in numerous locations using a portable SQUID receiver according to the present invention. The fit to the measured range dependence assumes a dipole source. At this relatively high frequency, a usable signal level above $10^{-13}$ femtoTesla at ranges over 200 meters. Lower frequency signals propagate more easily in the mine environment. This high frequency test essentially is the worst case for underground radio communication.

Figure 5:
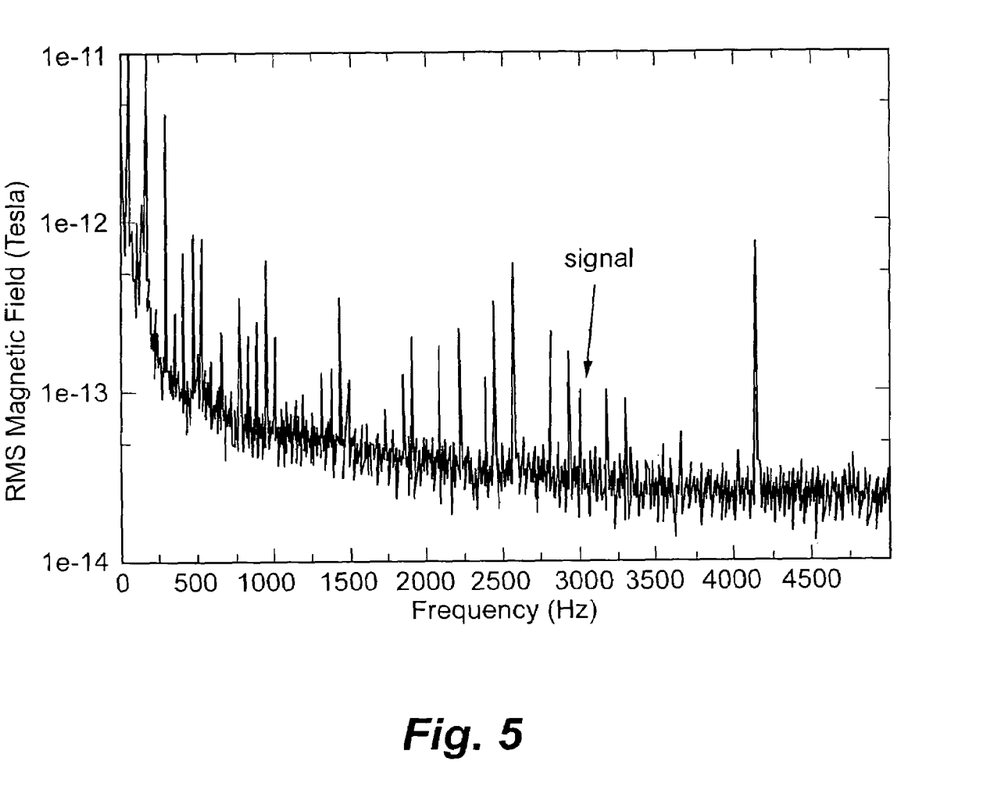
FIG. 5 is a wideband plot of a signal produced by the present invention measured with background noise.

In other field testing, using commercial devices discussed above, a white noise floor above 100 Hz that corresponds the noise floor of SQUID 29 (FIG. 2). The dominant noise source in the underground environment above the white noise floor is power-line noise introduced by local operations. In the test data obtained in mines, the power-line noise consists of 60 Hz and synchronized harmonics as illustrated in FIG. 5. These harmonics rapidly decrease with increasing frequency, leaving a large spectral range in which operation can be successfully conducted. The illustrated data were recorded at the waste isolation pilot plant at Carlsbad, N.Mex. The signal was a 3010 Hz sine wave at a power of 0.2 watts, with the transmitter 183 meters from the receiver.

Figure 6:
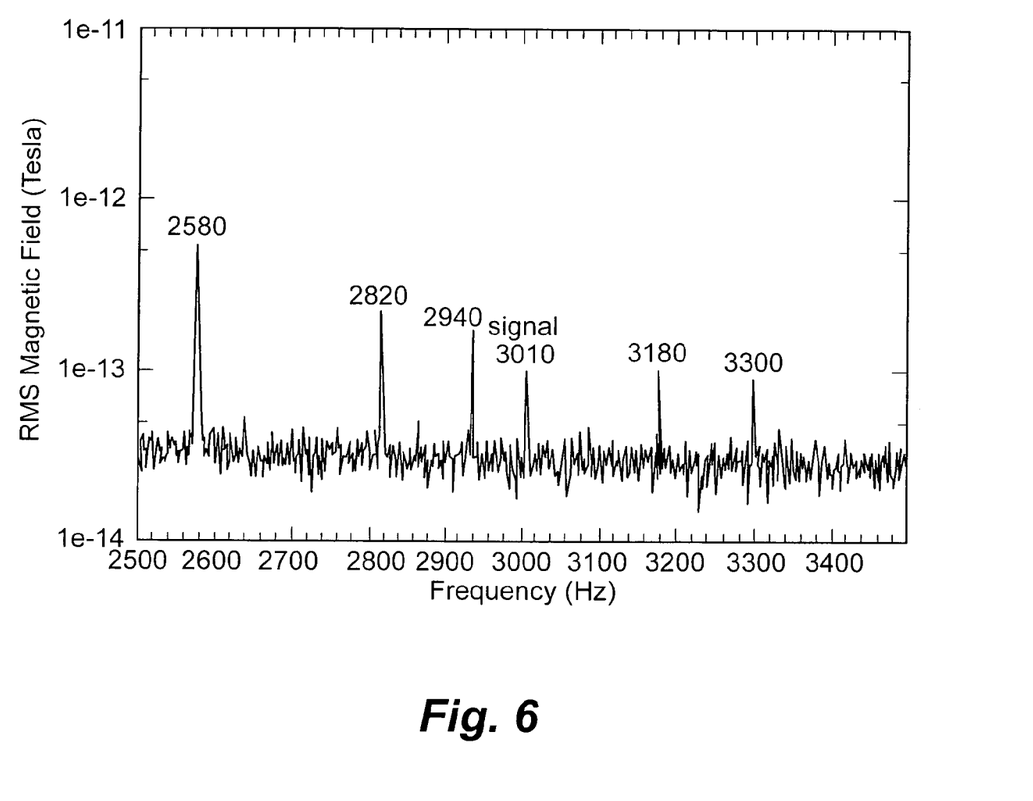
FIG. 6 is an expanded view of the data illustrated in FIG. 5.

An expanded view of FIG. 5 is shown in FIG. 6. As shown, the signal of interest is well above the broadband noise floor. Also as seen, there are a number of interfering peaks that are harmonically related to 60 Hz electrical power, with the odd numbered harmonics dominating. The harmonic peaks are narrow, implying that the power line interference is a slowly varying phenomenon. This allows the invention to use any of several simple comb filter algorithms to eliminate this interference.

Figure 7:
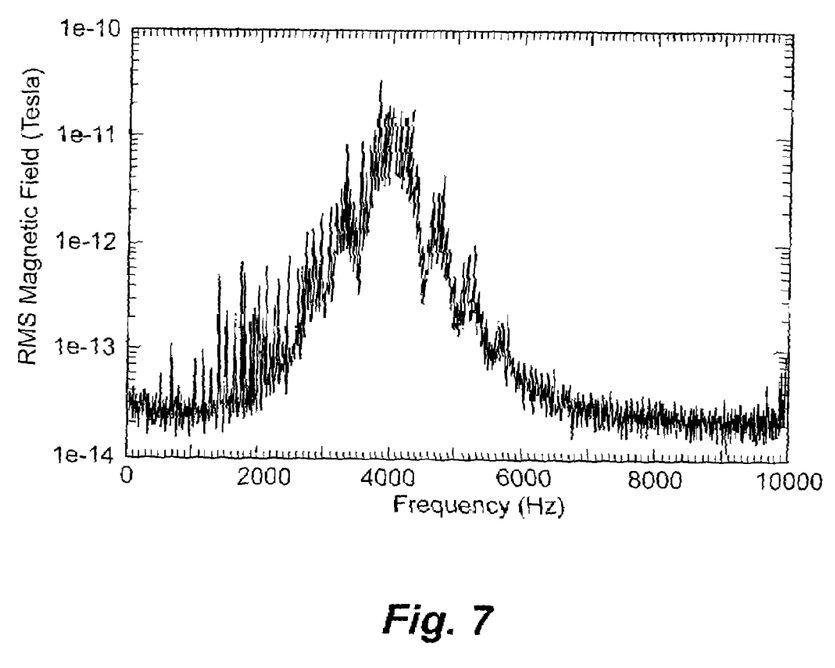
FIG. 7 is a graph of a signal from a transmitter centered at 4 kHz located 130 meters from the receiver in a mine.
Figure 8:
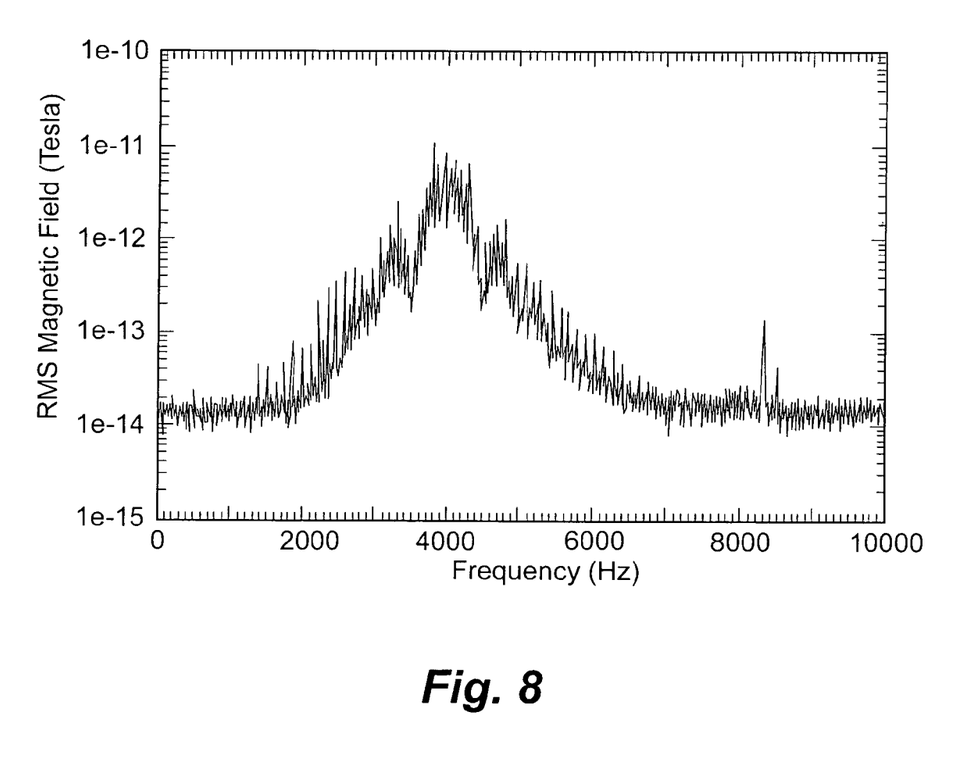
FIG. 8 is a graph of a signal at a range of 50 meters directly above the transmitter in a mine.

The present invention has been fully tested in actual field applications. The results are illustrated in FIGS. 7 and 8. The spectra for these tests were recorded from a point after band pass filter 31, but immediately before A/D converter 32 (FIG. 2). The measured magnetic field utilizes the field conversion for squid 29, but does not use the measured band pass of band pass filter 31. Therefore, It should be understood that the magnetic field scale is accurate only near the center of the pass band. The spectrums in both tests were taken with a 1 Hz bandwidth, so the power spectra and the power spectral density are numerically identical.

FIG. 7 illustrates the results of a test at a mine in Questa, N.Mex. Here, the transmitter loop was in the horizontal plane, with the receiver on the same mine level at a range of 130 meters. SQUID 29 (FIG. 2) in the receiver has a horizontal sense coil, and measured the vertical component of the magnetic field. The QAM signal is centered at 4 kHz. The sharp peaks in the spectra are interference from the electrical power system. The receiver repeatedly locked to this transmission and produced intelligible audio. Similar success in sending audio was accomplished with a horizontal polarization of the magnetic field at both the receiver and the transmitter.

Referring now FIG. 8, there can be seen the spectra of a test conducted at a Hecla Mining Facility in Mullan, Id. Here, the transmitter also has a horizontal loop, but receiver is 50 meters directly above the transmitter. The receiver coil is horizontal with a vertical magnetic field sense direction. This configuration represents the least favorable orientation for successful transmission. However, the receiver also repeatedly locked to this 4 kHz signal and produced intelligible audio.

Those with skill in this art will recognize that the invention can be configured as a transceiver. Both the transmitter and receiver can be grouped together on the same circuit board to provide convenience and versatility for the invention.

It should be understood that although audio signals have been described in the preceding paragraphs that the invention could be used with any type of digital signal as well. In the case of inputting a digital signal, such as images, A/D converter 22, and D/A converter 36 would not be employed in the invention, microphone 21 would be a digital input and speaker 37 would be changed to an appropriate digital output device. Such features could allow use of the present invention in the remote viewing of underground activities, such as in subways.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A through-the-earth communication system comprising:
    a digital signal input device;
    a transmitter operating at a predetermined frequency sufficiently low to effectively penetrate useful distances through-the earth, receiving said digital signal input and providing said digital input signal to a data compression circuit that is connected to an encoding processor;
    an amplifier receiving encoded output from said encoding processor for amplifying said encoded output and outputting said encoded output to an antenna; and
    a receiver having an antenna receiving said encoded output followed by a band pass filter being connected to a decoding processor whose output is connected to a data decompressor, said data decompressor providing a decompressed digital signal.

2. The apparatus as described in claim 1, wherein said digital signal input device is a digital video camera.

3. The apparatus as described in claim 1, wherein said antenna is a loop antenna.

4. The apparatus as described in claim 1, wherein said encoding processor operates using quadrature phase shift keying.

5. The apparatus as described in claim 1, wherein said encoding processor operates using a QAM-16 processor.

6. The apparatus as described in claim 1, wherein said predetermined frequency is approximately 4 kHz.

7. The apparatus as described in claim 1, wherein said predetermined frequency is approximately 7 kHz.

8. The apparatus as described in claim 1, wherein said band pass filter is of the wideband 4-pole elliptic design.

9. The apparatus as described in claim 1, wherein said antenna is a SQUID detector connected to a flux locked loop.

10. A method of conducting through-the-earth communication comprising the steps of:
    inputting an analog signal;
    digitizing said analog signal;
    compressing said digitized signal;
    encoding said compressed digitized signal to encode a predetermined data stream into said compressed digitized signal; and
    outputting said encoded compressed digitized signal through an antenna at a predetermined frequency that is sufficiently low to effectively penetrate useful distances through-the-earth as a transmitted signal;
    receiving said transmitted signal with an antenna after said transmitted signal has propagated through-the-earth;
    converting said transmitted signal from an analog signal to a digital signal;
    decoding said digital signal;
    decompressing said digital signal; and
    outputting said decoded decompressed digital signal.

11. The method as described in claim 10, where said antenna comprises a SQUID detector followed by a flux locked loop.

12. The method as described in claim 10, wherein said step of outputting said decoded decompressed digital data further comprises outputting to a speaker.

13. The method as described in claim 10, wherein said step of outputting said decoded decompressed digital data includes outputting an audio signal.

14. The method as described in claim 10, wherein said step of inputting an analog signal is accomplished by use of a microphone.

* * * * *